July 12, 1966   B. J. WATKINS ET AL   3,260,270
REMOTELY CONNECTING FLOWLINES
Original Filed Sept. 14, 1962   6 Sheets-Sheet 1

INVENTORS:
BRUCE J. WATKINS
GLENN D. JOHNSON
BY:
THEIR ATTORNEY

July 12, 1966

B. J. WATKINS ETAL 3,260,270

REMOTELY CONNECTING FLOWLINES

Original Filed Sept. 14, 1962

INVENTORS:
BRUCE J. WATKINS
GLENN D. JOHNSON

BY: *Oswald W. Wickmore*

THEIR ATTORNEY

July 12, 1966　　　B. J. WATKINS ETAL　　　3,260,270
REMOTELY CONNECTING FLOWLINES
Original Filed Sept. 14, 1962　　　6 Sheets-Sheet 3

INVENTORS:
BRUCE J. WATKINS
GLENN D. JOHNSON
BY: *Osnald H. Milmore*
THEIR ATTORNEY July 12, 1966  B. J. WATKINS ETAL  3,260,270
REMOTELY CONNECTING FLOWLINES
Original Filed Sept. 14, 1962  6 Sheets-Sheet 6

INVENTORS:
BRUCE J. WATKINS
GLENN D. JOHNSON
BY: Oswald W. Milmore
THEIR ATTORNEY United States Patent Office 3,260,270
Patented July 12, 1966

3,260,270
REMOTELY CONNECTING FLOWLINES
Bruce J. Watkins, Palos Verdes, and Glenn D. Johnson, Downey, Calif., assignors to Shell Oil Company, New York, N.Y., a corporation of Delaware
Original application Sept. 14, 1962, Ser. No. 223,696. Divided and this application Dec. 30, 1964, Ser. No. 422,349
7 Claims. (Cl. 137—15)

The present application is a divisional application of copending application Serial No. 223,696, filed September 14, 1962.

This invention relates to offshore wells drilled in earth formations located below a body of water, wherein the wellhead equipment of the well is submerged within the body of water. More specifically, this invention is directed to a method and apparatus for remotely coupling conduits submerged within a body of water. The invention has particular application in the replacement of worn and damaged conduits communicating with wellhead assemblies disposed beneath deep bodies of water. The apparatus includes both the coupling mechanism to establish sealed communication between the conduits and a coupling facilitating structure to be used in combination with the coupling mechanism.

For many years offshore wells have been drilled either from stationary platforms anchored to the ocean floor, movable barges temporarily positioned on the ocean floor, or from movable barges floating on the body of water in which drilling operations are being conducted. Regardless of the manner in which the wells are drilled, most wells have been completed in a manner such that the outermost tubular member of the well extends upwardly from the ocean floor to a point above the surface of the body of water where a wellhead assembly or Christmas tree is mounted for controlling the production of the well.

Wellheads extending above the surface of a body of water have the disadvantage that they constitute a hazard to navigation in the vicinity of the well. In addition, when such wellheads are positioned in salt water, such as found in the ocean, the structure extending above the water is subject to the corrosive action of salt water and air. Positioning the wellhead and/or casing head above the surface of the body of water has the advantage, however, that flow handling and controlling components of the wellhead may be readily secured thereto and adjusted by an operator working from a platform adjacent to the wellhead structure above the surface of the water.

Recently, methods and apparatuses have been developed for drilling and completing oil and gas wells in the ocean floor in a manner such that after completion of the well, the wellhead assembly, including the various components secured thereto, such as flowlines, is positioned beneath the surface of the ocean, preferably on the floor thereof. In practice, these wellhead assemblies are often positioned in depths of water greater than the depth at which a diver can safely and readily work. With the wellhead assembly positioned at such water depths, the coupling of flow conduits thereto presents a new and difficult operation which is not readily carried out by presently available wellworking equipment.

Therefore, a primary object of the present invention is to provide a means for coupling conduits submerged at considerable depths within a body of water.

Another object of the invention is to provide a means for replacing worn or damaged conduits secured to wellhead assemblies submerged within relatively deep bodies of water.

Another object of the invention is to provide a means to remotely couple fluid conduits disposed at locations inaccessible to human operators.

A more specific object of the invention is to provide an apparatus to remotely guide flowlines into aligned communication with conduits disposed on underwater wellheads.

Still another object of the invention is to provide a coupling apparatus adapted to be remotely actuated to establish a sealed connection between conduits submerged within a deep body of water.

The above, and other objects of the invention will become apparent from the following description and accompanying illustrations.

In its broadest aspect, the present invention provides a method of remotely conecting a pair of conduits submerged within a body of water. The method includes locating an operating station at the surface of the body of water and extending a flexible line from said operating station into slideable engagement with one of the conduits. After the flexible line is slideably engaged with the one conduit, a portion of the flexible line extending beyond the location of slideable engagement is fixedly secured to a portion of the other conduit desired to be connected to said one conduit. Tension is then applied to the flexible line from the operating station to pull the conduits towards juxtaposed relationship. Upon approaching the juxtaposed relationship, the ends of the conduits desired to be coupled are brought into axial alignment and continued tension is applied to the flexible line to force the conduits into the juxtaposed relationship. With the conduits so positioned, the ends are coupled together, thus establishing communication between the conduits.

Basically, the apparatus of the invention is designed to axially align and remotely connect the ends of a pair of conduits submerged within a body of water. The apparatus includes a coupling secured to the end of at least one of the conduits and connectible to the end of the other conduit. The apparatus further includes first and second guide elements secured to the conduits adjacent the ends thereof and engageable first and second aligning elements carried by said first and second guide elements, respectively. Upon engagement of the engageable aligning elements, at least one of said aligning elements is movable relative to the other about a substantially common axis to a final mating position at which point the ends of the pair of conduits are axially aligned and positioned to be connected by the coupling. In order to bring the aligning elements into the final mating position, a flexible line is fixedly attached to one of the guide elements and slideably engages and extends past the other of the guide elements to a source of tension, such as a winch.

The utility and operation of this invention will be more easily ascertained from the following detailed description of preferred embodiments thereof, when taken in conjunction with the accompanying drawings, in which:

FIGURE 15 is an elevational view, diagrammatically illustrating an alternative method of utilizing the embodiment of the invention illustrated in FIGURES 9 to 14; and, FIGURE 16 is an enlarged vertical section of an apparatus to be used with the alternative method illustrated in FIGURE 15.

Figure 1:
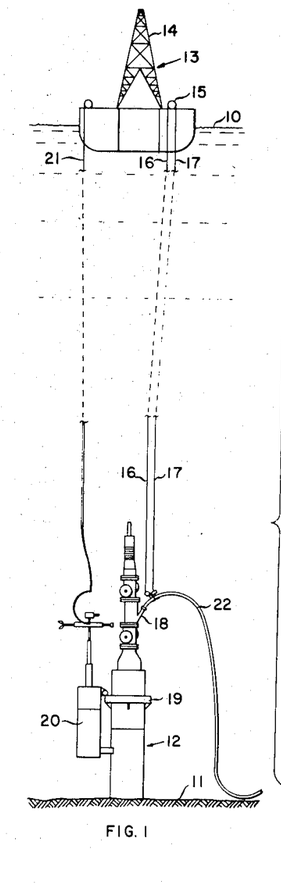
FIGURE 1 is an elevational view, diagrammatically illustrating the application of an embodiment of the invention to a wellhead assembly submerged within a body of water.

Referring now to FIGURE 1, the numeral 10 designates a body of water having a bottom 11 with a wellhead assembly 12 extending upwardly therefrom. An operating station 13 is disposed on the surface of the body of water above the approximate lacation of the wellhead assembly 12. The operating station may comprise a barge-like structure having a derrick 14 mounted on its upper surface. A winch 15 is disposed on the surface of the operating station 13 and has flexible lines 16 and 17, such as cable, extending therefrom into the body of water 10. The wellhead assembly 12 includes a laterally extending conduit 18 communicating with the interior thereof and a manipulator track 19 extending radially outward therearound. The manipulator track 19 is adapted to receive a manipulator 20 as described in detail in Canadian application Serial No. 876,060, filed May 21, 1963. The manipulator 20 is normally supported from the track 19 and with an operating line 21 attached thereto, the latter being suspended from the operating station. Electromotive and/or hydraulic force is conducted through the operating line from the station to the manipulator so as to operate wellhead components, such as valves, and to secure elements to the wellhead assembly through fastening bolts or other securing means.

Figures 2, 3:
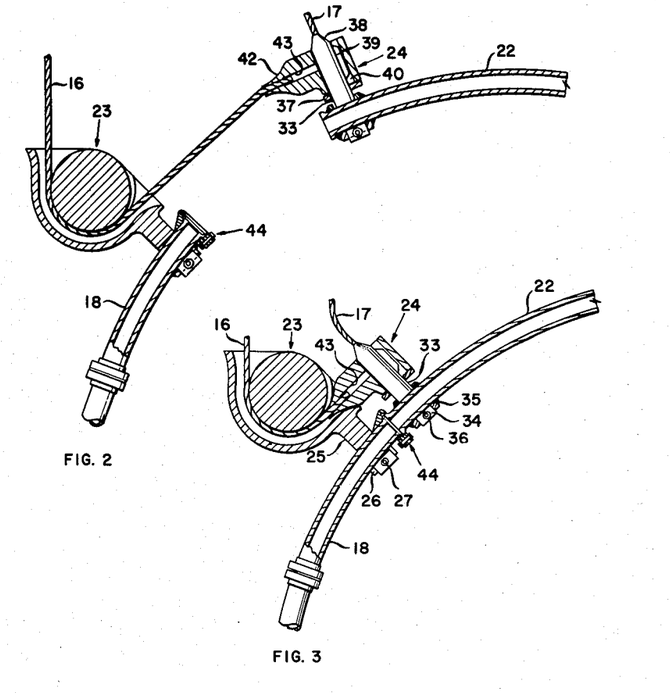
FIGURE 2 is an enlarged vertical section of the FIGURE 1 embodiment of the invention, illustrating the apparatus of the invention in the act of drawing a pair of conduits into coupled relationship.
FIGURE 3 is a vertical section corresponding to FIGURE 2, illustrating the apparatus after it has drawn the pair of conduits into coupled relationship.

In operation of the wellhead assembly 12 illustrated in FIGURE 1, a conduit or flowline 22 is coupled to the conduit 18. FIGURES 2 and 3 show the conduit 18 and flowline 22 in uncoupled and coupled conditions, respectively, and further illustrate the details of the coupling apparatus of the present invention.

Figure 4:
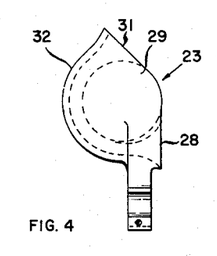
FIGURES 4 and 5 are elevational side and end views, respectively, of the guide of the FIGURE 1 embodiment of the invention.
Figure 5:
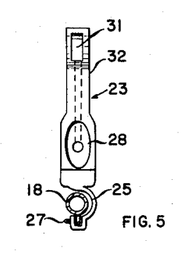
Figure 6:
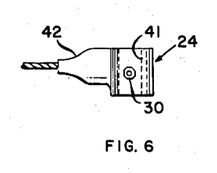
FIGURE 6 is an elevational side view of the follower of the FIGURE 1 embodiment of the invention.

The coupling apparatus comprises a coupling facilitating guide means including a guide 23 and a follower 24 secured to the conduit 18 and flowline 22, respectively. The guide 23 is secured to the condit 18 through means of an arcuate clamp member 25 engaging a longitudinal flange 26 on the conduit. An anchor bolt or set screw 27 is threadably received in the clamp member 25 and is adapted to be screwed against the flange 26, thereby fixing the clamp with respect to the conduit 18. One form of a guide member 23, as illustrated in detail in FIGURES 4 and 5, includes a tapered aligning aperature 28 of oval or elliptical shape extending therethrough and a drum-like structure 29 disposed directly above the tapered aperture. As clearly illustrated in FIGURE 4, a sheath 32 extends around the peripheral surface of the drum 29 to define a passage 31. This structure, as will be described in detail subsequently, is adapted to guidingly receive the flexible line 16 and direct it through the aperture 28.

The follower 24 of the guide means is secured to the flowline 22 through a receiver 33 clamped to the line 22 in a manner corresponding to the clamping arrangement between the guide 23 and the conduit 18, described supra. This clamping arrangement includes a clamp member 34, longitudinal flange 35, and anchor bolt or set screw 36 corresponding to the elements 25 to 27, respectively, described with reference to guide 23. It is noted that the longitudinal flanges 26 and 35 maintain the elements secured thereto in the fixed radial orientation relative to the conduit 18 and flowline 22, respectively. The receiver 33 also includes a stop flange 37 and a radially extending finger element or rod 38 terminating in a tapered section adapted to fixedly receive the flexible line 17.

The follower 24 has a passage 41 extending therethrough of a diameter sufficient to slide over the finger element 38. A set screw or bolt 30 is threadably received in the wall of the passage 41 and is adapted to be screwed against the finger element 38 to secure the follower in seated engagement therewith. In operative position, as illustrated in FIGURES 2 and 3, the passage 41 of the follower is received on the finger element 38, with the lower surface of the follower in seating engagement with the stop flange 37 of the receiver. Due to the relative dimensions of the flexible line 17, finger element 38, and passage 41, the follower is adapted to slide down the line 17 into seated engagement with the receiver. Thus, if desired, the follower may be slid down the line 17 into engagement with the receiver 33 from a location remote from said receiver, such as the operating station illustrated in FIGURE 1. The follower 24 also includes a necked-down nose or aligning portion 42 extending laterally from the passage 41. When the follower 24 is seated on the finger element 38, it is necessary, for operational reasons that will be apparent from the following description, that the nose portion 42 be maintained in axial alignment with the flowline 22. Therefore, preferably the finger element 38 is provided with a key 39 to be received in a keyway 40 of the passage 41. The nose portion, as illustrated in FIGURE 3, is dimensioned and formed so as to be adapted to seat and mate in an oriented or aligned position in the tapered oval or elliptical aperture 28 of the guide 23. The oval or elliptical shape of the aperture 28 and the mating dimensions of the nose portion 42 assure that the guide 23 and follower 24 will assume a fixed radial orientation upon seating of the pose portion 42 in the aperture 28. The nose portion 42 is also provided with a passage 43 extending axially therethrough and adapted to fixedly receive the line 16, as shown in FIGURES 2 and 3. Through this arrangement, tension applied to the line 16 functions to pull the nose portion into seated engagement with the tapered aperture 28, thus axially aligning the ends of the conduit 18 and flowline 22, as illustrated in the aforedescribed figures.

Figure 7:
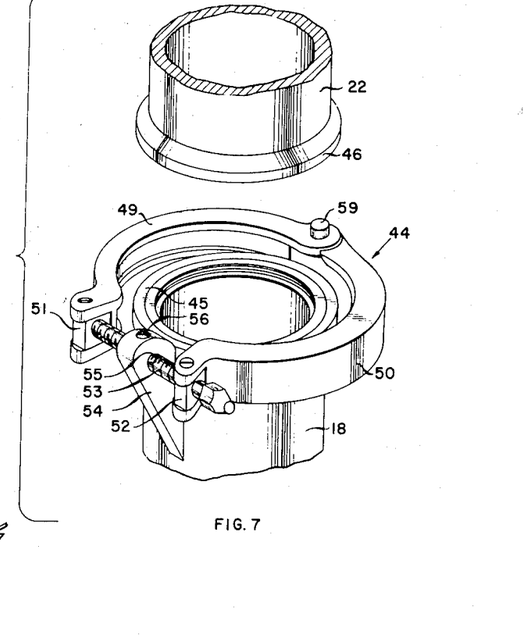
FIGURE 7 is a perspective view of a coupling of the invention shown in disengaged condition.
Figure 8:
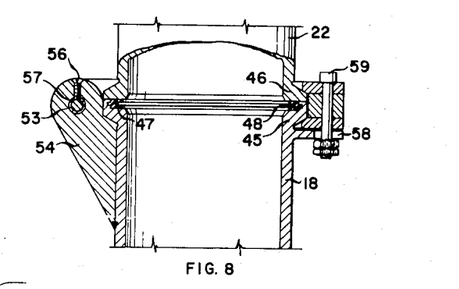
FIGURE 8 is a sectional view of the coupling illustrated in FIGURE 7, showing the components of the coupling in engaged condition.

FIGURES 7 and 8 illustrate a coupling structure adapted to be used in combination with the above-described coupling facilitating structure. The coupling structure of FIGURES 7 and 8 is also shown in operative condition in FIGURES 2 and 3. From the latter figures, it is believed apparent that the coupling structure establishes sealed communication between the conduit 18 and flowline 22 when the guide and follower assume the seated position illustrated in FIGURE 3. Referring now to FIGURES 7 and 8, the numeral 44 designates the coupling in its entirety. The coupling includes radially extending annular flanges 45 and 46 on the ends of the conduit 18 and flowline 22, respectively. The flanges 45 and 46 are formed so as to establish sealed communication between the conduit 18 and flowline 22 upon juxtapositioning of the end surfaces of said flanges as illustrated in FIGURE 8. To assure such sealed communication, the flange 45 has a hydraulic self-sealing resilient ring 47 keyed in the end thereof and extending outwardly therefrom into engagement with the flange 46. The ring 47 is held in keyed engagement with the flange 45 by a split expansion ring 48 extending around the grooved inner surface thereof.

The coupling 44 further includes a hinged pair of arcuate clamping or connector members 49 and 50 extending around the periphery of the flange 45 in aligned relationship with respect thereto. The inner surfaces of the clamping members 49 and 50 are recessed in a concave U-shaped configuration and are adapted to clampingly engage the outer shoulders of the flanges 45 and 46. The free ends of the clamping members 49 and 50 have pivotally secured thereto blocks 51 and 52, respectively, having threaded openings extending therethrough and adapted to assume an aligned relationship. As illustrated, the aligned openings in the blocks 51 and 52 threadably receive the oppositely threaded ends of an operating bolt 53. Through this arrangement, turning of the bolt 53 functions to force the inner concave surfaces of the clamp members into or out of engagement with the outer shoulders of the flanges 45 and 46. In order to maintain the clamping members 49 and 50 in relatively fixed relationship with respect to the conduit 18, the conduit is provided with an arm 54 to receive the bolt 53 between the oppositely threaded ends thereof. Retention of the bolt 53 in the arm 54 is accomplished through means of an aperture 55 extending through the arm normal to the axis of the conduit 18. As shown in FIGURE 8, the aperture 55 receives a non-threaded center section of the bolt 53 in rotational engagement therewith. In order to prevent lateral movement of the bolt 53 within the arm 54 while permitting rotational movement therebetween, a set screw 56 extends threadably through the arm into the aperture 55 and into slidable engagement with a circumferential groove 57 on the unthreaded central section of the bolt. The clamping members 49 and 50 are further retained in position with respect to the conduit 18 by a forked arm 58 fixed to the conduit and extending into slidable engagement with a pintle 59 passing through the hinged ends of the clamping members. As shown in FIGURE 8, the fork in the arm 58 is sufficiently large to permit the pintle 59 to slide therein during hinged movement of the clamp members.

From the foregoing description, the operation of the coupling 44 is believed apparent. With the clamping members 49 and 50 in the expanded condition, as illustrated in FIGURE 7, the flange 46 of the flowline 22 may be taken into or out of engagement with the flange 45 of the conduit 18. Upon being directed into a juxtaposed and aligned relationship as illustrated in FIGURE 8, the flanges 45 and 46 may be forced into engagement by tightening the clamping members 49 and 50 through means of the bolt 53. Turning of the bolt 53 is preferably accomplished through means of a remotely controlled wrench mechanism on the manipulator 20, as disclosed in aforementioned application Serial No. 876,060. Thus, the coupling 44 is well suited for remote operation on underwater wellhead assemblies as illustrated in FIGURE 1.

The application of the coupling and coupling facilitating apparatus of the FIGURES 1 to 8 embodiment of the invention will now be exemplified with reference to its use with underwater wellhead assemblies, as illustrated in FIGURE 1. Initially, the conduit 18 of the wellhead assmbly and the flowline 22 are provided with the coupling apparatus illustrated in detail in FIGURES 7 and 8. Preferably, the coupling components are secured to the conduit and flowline prior to the time they are lowered into their underwater location. The longitudinal flanges 26 and 35 are also preferably secured in place, as by welding, before the conduit 18 and flowline 22 are lowered into the body of water 10.

The guide 23 and receiver 33 may be secured to the respective flanges 26 and 35 either before or after the wellhead assembly 12 and flowline 22 are positioned in operative locations at the bottom of the body of water. If the guide and receiver are installed before the wellhead assembly and flowline are lowered into the water, the installation procedure may be easily carried out by human operators. It is noted, however, that it is often undesirable to install the guide and receiver members at the surface of the water, since the flexible lines 16 and 17 leading to these members impose a hazard to navigation and also require an attendant station above the wellhead assembly at all times. For the latter reasons, the guide and receiver members of the present invention are adapted to be installed in operative position in considerable depths of water, even those beyond the reach of human divers. Such installations may be accomplished through means of the power driven remotely actuated manipulator 20.

In applying the manipulator 20 to the installation of the guide and receiver of the present invention, the set screws 27 and 36 of the guide and receiver, respectively, are releasably secured to the power driven wrench heads of the manipulator. With the set screws so secured, the manipulator, with the guide or receiver and the flexible lines secured thereto, is lowered to the wellhead assembly or flowline. The manipulator is then activated to install the guide or receiver in its operative position. It is noted that although the guide and receiver are illustrated as being installed on the conduit 18 and flowline 22, respectively, this arrangement may be reversed without departing from the invention. Installation on the wellhead assembly 12 is facilitated by the manipulator track 19 therearound, since this track is adapted to receive the manipulator 20 as illustrated in FIGURE 1. Through means of the remote control system on the manipulator, the manipulator is also well facilitated to install the receiver 33 on the flowline 22. It is to be understood that the manipulator 20 may also be utilized to remove the guide and receiver from the conduit 18 and flowline 22, respectively, or to turn the operating bolt 53 of the coupling 44.

The operation of the apparatus will now be described with reference to a wellhead assembly and flowline submerged within a body of water, as shown in FIGURE 1, with the guide, receiver, and coupling of the invention secured in their operative positions. For the purpose of illustration, the flowline 22 will be assumed to be in a position removed from the conduit 18 of the wellhead assembly. In such condition, the flexible line 17 secured to the receiver 33 on the flowline 22 extends upwardly to the operating station 13. Furthermore, in this initial condition, the line 16 is looped around the drum 29 and extends through the sheath 32. With the line 16 so looped, one end thereof is secured to the winch 15 and the other end thereof having the follower 24 secured thereto is held on the operating station. In order to pull the flowline 22 towards alignment with the conduit 18, as illustrated in FIGURE 2, the follower 24 secured on the operating station 13 is slid onto the flexible line 17 extending to said station. The winch 15 secured to one end of the line 16 is then activated to pull the end of the line secured thereto upwardly, thus pulling the line 16 around the drum 29 and sliding the follower 24 down the line 17 into engagement with the receiver 33. At this point, the follower is secured in seated engagement with the receiver 33 by tightening the set screw 30 with the manipulator 20. After the follower is secured to the receiver, continued tension is applied to the line 16 through the winch 15, thus pulling the line 22 towards the conduit 18 as illustrated in FIGURE 2. The continued tension on the flexible line 16 functions to pull the nose of the follower 24 into engagement with the guide as illustrated in FIGURE 3. With the guide and follower so positioned, the flanged ends of the conduit 18 and flowline 22 are in juxtaposed and axially aligned relationship, and the clamping members 49 and 50 are disposed around the peripheries of the flanges. At this point, the manipulator 20 may be lowered onto the manipulating track 19 and activated to drive the operating bolt 53, thus coupling the conduit and flowline in sealed communication as illustrated in FIGURE 3.

With the conduit 18 and flowline 22 coupled, as illustrated in FIGURE 3, the guide 23 and receiver 33 may be removed therefrom. Removal is accomplished by activating the manipulator 20 to loosen the set screws 27 and 36 and remove the respective guide and receiver. Upon removal, the guide and receiver may be applied to subsequent conduits to facilitate their coupling, or they may be pulled up to the operating station 13 through means of the flexible lines 16 and 17.

Referring now to FIGURES 9 to 14 of the drawings, therein is illustrated an embodiment of the invention incorporating an alternative guide and coupling structure to facilitate conduit coupling corresponding to that described with reference to FIGURES 1 to 8. The embodiment of FIGURES 9 to 14 is particularly adapted for use in the replacement of damaged or worn flowlines coupled to underwater installations. As is obvious from FIGURES 9 to 12, the embodiment of the invention illustrated therein is designed to be used in combination with an operating station and wellhead assembly corresponding substantially to that described with reference to FIGURE 1. Therefore, corresponding components in the respective figures will be designated by like numerals.

Figure 9:
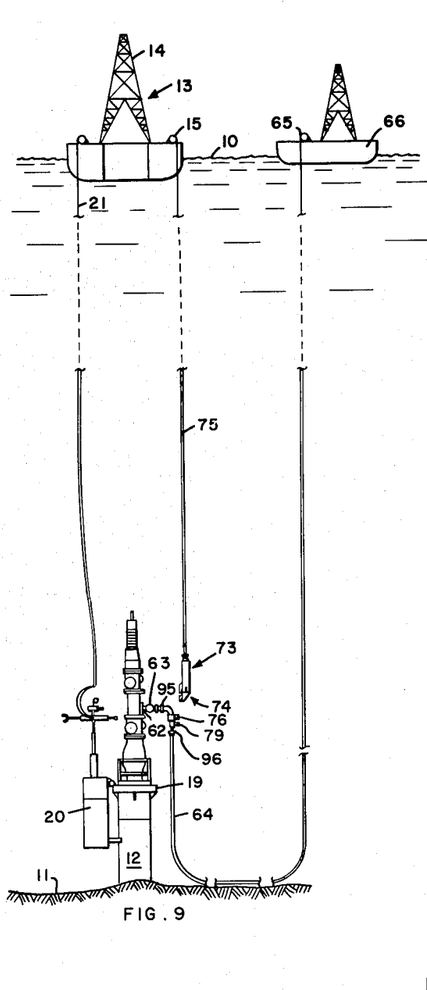
FIGURES 9 to 12 are elevational views of another embodiment of the invention, diagrammatically illustrating the embodiment shown therein in sequential steps of its application in an environment corresponding to that of FIGURE 1.
Figure 10:
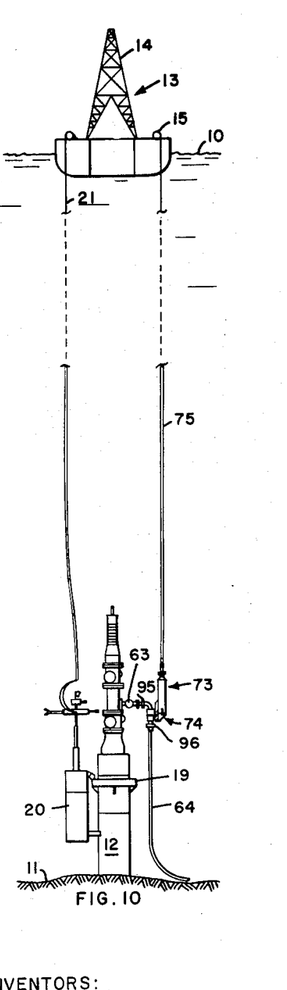
Figure 11:
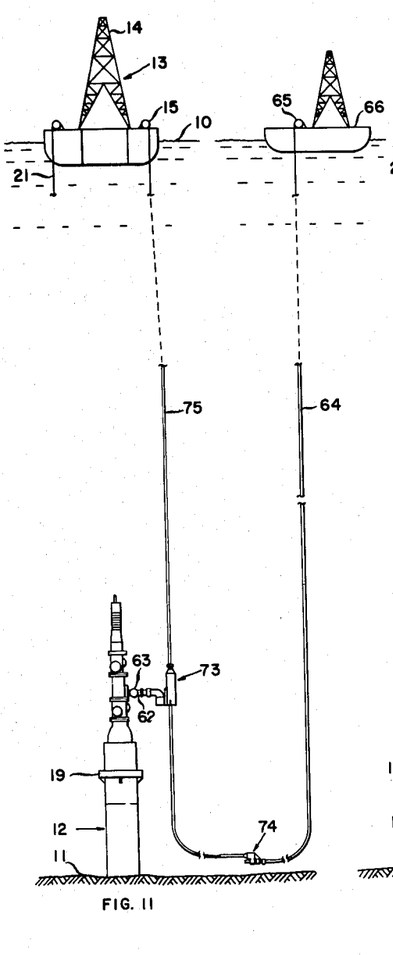

The wellhead assembly 12 of FIGURES 9 to 12 includes a laterally extending conduit 62 having a valve 63 interposed therein. The conduit 62 is similar to the aforedescribed conduit 18, in that it communicates with the interior of the wellhead assembly. During normal operation of the wellhead assembly 12 and the conduit 62 communicating therewith, a conduit or flowline 64 is coupled to the conduit 62 as illustrated in FIGURE 9. FIGURES 9 to 12 illustrate the flowline 64 in sequential positions it assumes during the application of the embodiment of the invention shown therein in the removal and installation of the flowline. As illustrated in FIGURES 9 and 11, the flowline 64 extends upwardly to a winch 65 located on a barge 66. The barge 66 may be in close proximity to the barge 13 or may possibly be located several miles therefrom. It is to be understood, that although FIGURES 10 and 12 omit the barge 66 for purposes of simplification, the combination shown in these figures would include a barge 66 positioned as illustrated in FIGURES 9 and 11. Furthermore, although the flowline 64 is shown extending only to the barge 66, it is anticipated that the end of the flowline communicating with the winch 65 could communicate with a flowline extending downwardly from the barge 66 to an underwater "trap farm" or producing station.

Figure 12:
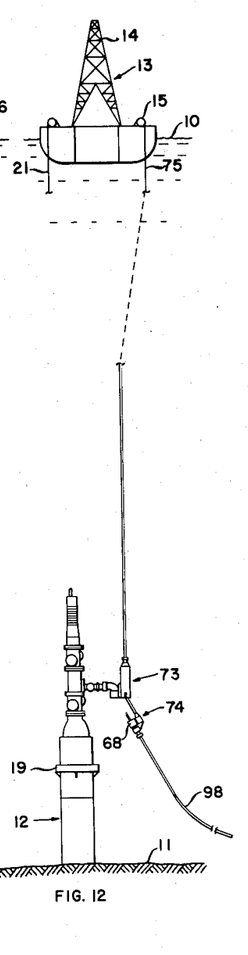
Figures 13, 14:
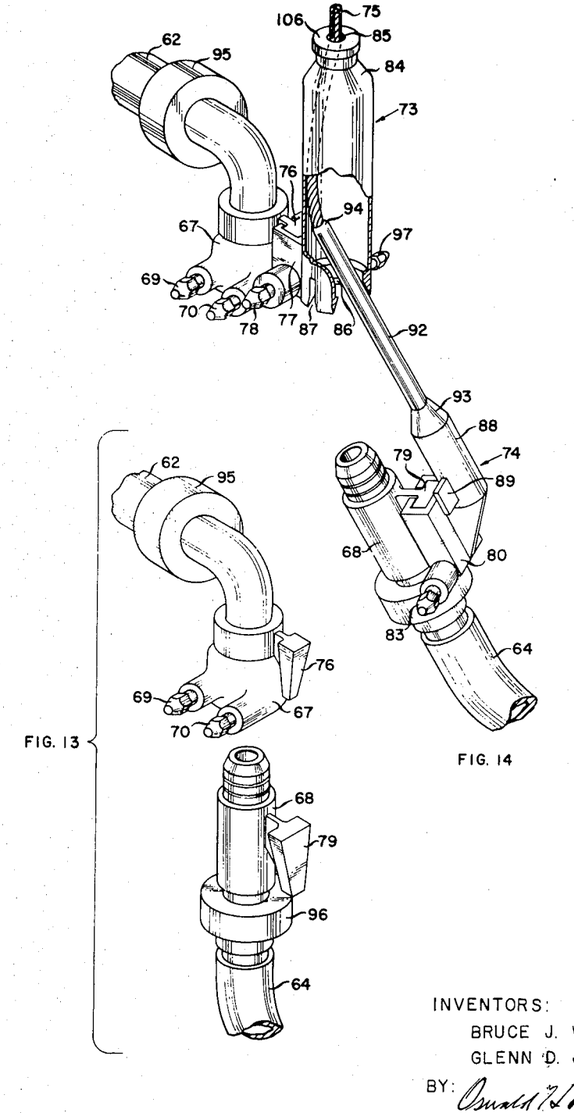
FIGURE 13 is an exploded perspective view of a pair of conduits adapted to have the FIGURES 9 to 12 embodiment of the invention applied thereto.
FIGURE 14 is a perspective view illustrating conduits corresponding to those of FIGURE 13 having the apparatus of the FIGURES 9 to 12 embodiment of the invention applied thereto in operative condition.

The coupling and coupling facilitating apparatus of the FIGURES 9 to 14 embodiment is shown in detail in FIGURES 13 and 14. The coupling apparatus, as clearly illustrated in the latter figures, includes a female member 67 secured to the free end of the conduit 62 and a male member 68 secured to the flowline 64 and adapted to be received within the female member 67. A detailed description of the structure and operation of this coupling apparatus is found in application Serial No. 72,064, filed November 28, 1960, now abandoned. As described in that application, the female coupling member 67 of the instant application includes locking pins 69 and 70 threadably received therein to secure the member 68 in engagement therewith. The locking pins 69 and 70 are provided with heads adapted to be driven by the aforedescribed manipulator 20.

The coupling facilitating apparatus of the FIGURES 9 through 14 embodiment of the invention comprises guide means including a guide sleeve 73 and a guide bar or follower 74. In operative condition, as illustrated in detail in FIGURE 14, the guide sleeve 73 and guide bar 74 are secured to the coupling members 67 and 68, respectively. From FIGURE 14, it is also apparent that the coupling facilitating guide means includes a flexible line 75 secured to the free end of the guide bar 74 and adapted to be threadably received through the guide sleeve 73. The guide sleeve 73 is secured to the female coupling member 67 through means of a tapered lug 76 fixed to the member 67 by welding, or the like, and a socket member 77 fixed to the sleeve and adapted to be slidably received on the lug 76. An anchor bolt or set screw 78 is threadably received in the socket member 77 and is adapted to be screwed into clamping engagement with the lug 76 upon receipt of the socket member thereon, thus securing the female member 67 and the guide sleeve 73 in fixed relationship with respect to each other. The guide bar 74 is secured to the male coupling member 68 through means of a tapered lug 79 fixed to the member 68 and a socket member 80 secured to the guide bar. The lug 79 and socket member 80 are adapted to engage each other in a manner corresponding to that described with reference to elements 76 and 77 and are adapted to be clamped in fixed engagement through means of an anchor bolt or set screw 83 corresponding to the anchor bolt 78.

Upon securing of the coupling facilitating apparatus to the male and female coupling members, as described with reference to FIGURE 14, the coupling facilitating apparatus may be utilized to pull the coupling elements into engagement. In order to facilitate this operation, the guide sleeve 73 is provided with an upper end 84 of cone-shaped configuration terminating in an opening 85 slidably receiving the flexible line 75. The operation is also facilitated through means of a tapered shoulder 86 formed at the lower end of the guide sleeve 73. A keyway 87 having diverging lower edge portions is formed through the guide sleeve 73 and shoulder 86 and opens through the lower edge of said sleeve and shoulder.

The guide bar 74 is also provided with operation facilitating elements adapted to cooperate with the aforedescribed structure of the guide sleeve 73. These elements include an enlarged cylindrical portion 88 having a key 89 extending laterally therefrom and a narrowed rod section 92 secured to the cylindrical section 88 in axial alignment therewith through a tapered portion 93. The upper end of the rod section 92 terminates in a rounded head portion 94 adapted to fixedly receive an end of the flexible line 75.

FIGURE 14 illustrates the operation of the coupling facilitating apparatus during pulling of the coupling members 67 and 68 into coupled engagement. As illustrated, the coupling members 67 and 68 having the sleeve 73 and guide 74, respectively, secured thereto, are initially in separated condition. In order to pull the elements of the coupling into engaged relationship, tension is applied to the upper end of the flexible line 75, thus pulling the head portion 94 of the rod section 92 into the lower end of the sleeve 73 as illustrated in FIGURE 14. It is noted that the relative dimensions of the rod section 92 and the sleeve 73 and shoulder 86 formed therein facilitate entry of the rod section into the sleeve, even though a considerable angle of misalignment may exist between the sleeve and rod section. Continued tension applied to the flexible line 75 functions to pull the rod section 92 up within the sleeve 73, thus bringing the guide bar 74 towards alignment with the sleeve 73. Upon pulling the flexible line 75 to a point where the head portion 94 enters the cone-shaped upper end 84 of the cylinder, and the cylindrical section 88 enters the lower end of the sleeve, the guide sleeve 73 and guide bar 74 will assume an axially aligned relationship. At this point, if the keyway 87 and key 89 are in aligned relationship, continued tension will functon to pull the key into engagement with the keyway. With the keyway 87 and key 89 in aligned relationship, the female member 67 and male member 68 of the coupling will be in axially aligned relationship. This aligned relationship is assured by arrangement and relative dimensions of the coupling members and the coupling facilitating structure secured thereto. Thus, pulling of the key 89 into the keyway 87 will pull the aligned coupling members into engaged relationship.

Although the foregoing description of the operation referred to a situation where the keyway 87 and key 89 assume an aligned relationship upon pulling of the guide bar into the guide sleeve, it is believed apparent that this situation would not necessarily occur. In the situation where the keyway and key do not assume an aligned relationship upon pulling of the guide bar into the guide sleeve, external forces may be applied to the guide bar to facilitate this alignment. In underwater installations, as illustrated in FIGURES 9 to 12, such forces may be imparted through means of the manipulator 20. As will be developed in the subsequent description, the manipulator 20 may also be utilized to drive the pins 69 and 70 and the bolts 78 and 83.

The application and operation of the coupling and coupling facilitating apparatuses described with reference to FIGURES 13 and 14 will now be developed with reference to its application to underwater wellhead assemblies, as illustrated in FIGURES 9 to 12. The latter figures show the apparatus in sequential positions of its application and operation. Specifically, the sequence shown in these figures, illustrates the embodiment of the invention shown therein during its application in replacing a worn or damaged flowline connected to an underwater wellhead assembly.

Referring now to FIGURE 9, the wellhead assembly 12 is shown having a flowline 64 connected to the laterally extending conduit 62. The conduit and flowline are connected through means of coupling members 67 and 68 as described in detail with reference to FIGURE 13. In order to provide for flexibility between the conduit 62 and flowline 64, the coupling members 67 and 68 are preferably secured to the conduit 62 and flowline 64 through swivels 95 and 96, respectively. These swivels are of conventional commercially available character and function to facilitate alignment of the coupling members while minimizing the amount of strain on the conduit 62 and flowline 64 resulting from twisting and bending forces. The coupling members 67 and 68 illustrated in FIGURE 11 are also provided with lugs 76 and 79, as described in detail supra. Preferably, the lugs 76 and 79 are welded to the coupling elements 67 and 68, respectively, prior to the time these coupling members are installed in the underwater location illustrated in FIGURE 11.

With the workover station 13 positioned above the wellhead assembly 12, as illustrated in FIGURE 9, the apparatus of the invention illustrated therein is in condition to be applied to the wellhead assembly. Initially, the manipulator 20 and coupling facilitating apparatus are lowered into the illustrated positions through means of lines 21 and 75, respectively. It is anticipated that the lines 21 and 75 and the components secured thereto may be lowered either separately or concurrently. If the lines are lowered concurrently, it is desirable to couple the manipulator to the elements 73 and 74, since the manipulator is provided with control means that would facilitate the positioning of the elements 73 and 74 in the desired location. It is noted, that in the condition shown in FIGURE 9, the guide bar 74 is suspended on the line 75 and the guide sleeve 73 is supported on the guide bar in seated engagement therewith. In order to maintain this seated engagement, the guide sleeve 73 is preferably provided with a set screw 97 adapted to be screwed through the wall thereof into releasable engagement with the guide bar 74.

After the sleeve 73 and bar 74 have been lowered to a position adjacent the wellhead assembly 12, as illustrated in FIGURE 9, the socket members 77 and 80 are directed into engagement with the lugs 76 and 79, as illustrated in FIGURE 10. It is noted that when the guide sleeve 73 is seated on the guide bar 74, as illustrated in FIGURES 9 and 10, the socket members 77 and 80 carried by the sleeve and guide bar, respectively, are spaced apart a distance corresponding to the distance between the lugs 76 and 79 on the coupled coupling members 67 and 68. The latter arrangement facilitates simultaneous seating of the socket members on the lug members, as illustrated in FIGURE 10. After the socket members 77 and 80 are seated on the lugs 76 and 79, the anchor bolts 78 and 83 are tightened through means of the manipulator 20 and, thus the guide sleeve 73 is secured to the coupling member 67 and the guide bar 74 is secured to the coupling member 68.

With the guide sleeve and guide bar secured in position, the apparatus is in condition to facilitate removal of the flowline 64. To commence the latter operation, the set screw 97 is backed off through means of the manipulator 20, thereby releasing the guide bar and guide sleeve from locked engagement. After the set screw 97 has been backed off, the manipulator 20 is activated to back out the locking pins 69 and 70 and thus release the coupling members from locked engagement. At this point, the flowline 64 is released from the conduit 62 and is free to fall to the position illustrated in FIGURE 11. With the flowline so released, the winch 65 on the barge 66 may be activated to pull the flowline with the guide bar 74 and flexible line 75 secured thereto up to the barge 66. As is apparent from FIGURE 11, the flexible line 75 is payed out through the guide sleeve 73 during the time the flowline is being pulled up the barge 66.

After the flowline 64, guide bar 74 and flexible line 75 have been pulled up to the barge 66, the apparatus is in condition to commence installation of a new flowline on the wellhead assembly. As a first step in this installation, the guide bar 74 is removed from the damaged or worn flowline 64 and is applied to a new flowline 98 having a coupling member 68 secured to the end thereof. With the guide bar 74 and flexible line 75 secured to the new flowline 98, the new flowline may be brought into engagement with the conduit 62 in a manner corresponding substantially to a reversal of the operations used to remove the flowline 64, as described above. During the latter operation, the flexible line 75 is pulled upward toward the workover station 13 and the new flowline 98 is payed out from the barge 65. Continued upward pulling on the line 75 acts to draw the guide bar 74 into the guide 73, as illustrated in FIGURE 12. Upon being pulled into the guide 73, the guide bar 74 functions to facilitate engagement of the coupling members 67 and 68, as described in detail supra with reference to FIGURE 14. After the coupling members are engaged, the manipulator 20 is activated to tighen the locking pins 69 and 70, and if desired the manipulator may also be used to loosen the anchor bolts 78 and 83 and remove the coupling facilitating apparatus. It is noted that the manipulator 20 may be utilized to assist in aligning of the keyway 87 and key 89 during the time the guide bar is being pulled into the guide sleeve.

Figures 15, 16:
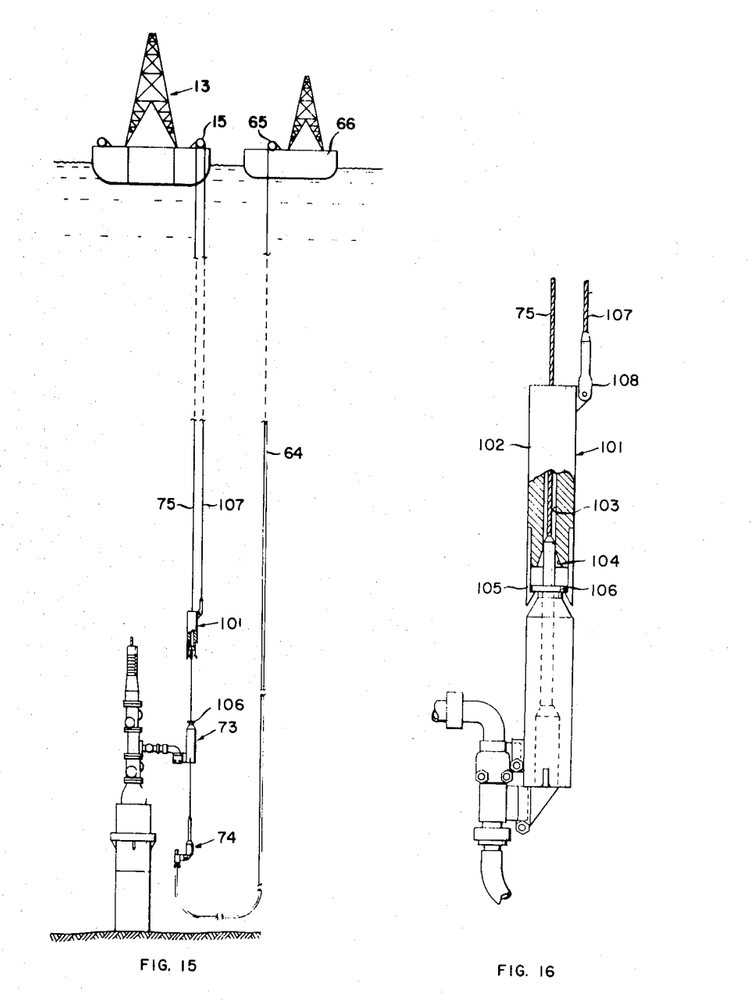

Referring now to FIGURES 15 and 16, therein is illustrated an apparatus to facilitate operation of the FIGURES 9 to 14 embodiment of the invention in situations where the damaged or worn flowline 64 may not be retrieved on a barge 66, as described supra. The latter situations may occur under varied circumstances, for example, where a barge 66 is unavailable, or where the damaged or worn flowline 64 has insufficient strength to permit its pulling to the barge 66. In such situations, after the guide sleeve and guide bar have been installed, as illustrated in FIGURE 10, it is impossible to transfer the guide bar to a new flowline by the method described supra. Therefore, the end of the flexible line 75 extending below the guide sleeve 73, and the guide bar 74 fixed thereto, must be secured to a new flowline by an alternative procedure. As a first step in this alternative securing procedure, the guide sleeve 73 secured to the conduit 62 must be removed from the conduit, for reasons to be developed subsequently, and preferably retrieved. A preferred form of retriever designed for this use is illustrated in FIGURE 16.

Referring now to FIGURE 16, the numeral 101 designates the retriever in its entirety. The retriever includes a cylindrical member 102 having a passage 103 of a diameter slightly greater than the rod section 92 extending therethrough. The lower end of the passage 103 is provided with an enlarged conical section 104 to facilitate guidance of the rod section 92 into the passage 103. The retriever 101 further includes resilient hooked fingers 105 extending longitudinally from the outer surface of the cylindrical member 102 at spaced intervals therearound. As illustrated in FIGURES 15 and 16, the retriever 101 is adapted to be slidably received on the line 75 and to be lowered thereon into an engaged position on the guide sleeve 73. Upon being lowered into an engaged position on the guide sleeve 73, the fingers 105 engage a flange 106 extending therearound. In order to control the rate at which the retriever 101 slides down the flexible line 75, and to impart upward movement to the retriever, a flexible line 107 is secured to the retriever through a pivotal connection 108. The upper end of the flexible line 107 extends to the workover station 13 and is preferably secured to a winch thereon.

At the commencement of the alternative procedure, it is assumed that the guide sleeve 73 is installed as illustrated in FIGURE 15. It is noted, that in the case being described, it is not possible to recover the damaged or worn flowline 64 through means of the barge 66 and the winch thereon. Thus, it can be seen that it would be desirable to be able to pull the flowline 64 to the surface of the body of water 10 through means of the flexible line 75. However, upon observation, it can also be seen that the guide sleeve 73 secured as illustrated in FIGURE 15 would prevent the use of the flexible line 75 for this purpose. In order to remove the obstacle presented by the guide sleeve 73, the retriever 101 is lowered down the flexible line 75 and into engagement with the sleeve as illustrated in FIGURES 15 and 16. After the retriever 101 has engaged the sleeve 73, the manipulator 20 is activated to loosen the anchor bolt 78 and thereby release the sleeve from the lug 76. At this point, the flexible line 107 may be pulled upwardly, thus pulling the retriever and the sleeve secured thereto to the operating station 13. With the sleeve 73 thus removed, the winch 15 may be activated to pull the flexible line 107 and the guide bar and flowline 64 secured thereto to the operating station. The flexible line 75 may then be threaded through the sleeve 73 and connected to a new flowline through means of the guide bar 74. With the line 75 so secured to a new flowline, sufficient slack may be paid out to the flexible line 75 to permit the sleeve 73 to be lowered and installed in position on the wellhead assembly through means of the lug 76. Tension may then be applied to the flexible line 75 to pull the new flowline into engagement with the coupling member 67 in the manner described with reference to FIGURES 12 and 14.

If, after the sleeve 73 has been removed from the wellhead assembly through means of the retriever 101, it is found that the flexible line 75 cannot be used to retrieve the worn or damaged flowline 64, the guide bar 74 and guide sleeve 73 may still be utilized to install a new flowline on the wellhead assembly. In the latter case, the damaged or worn flowline 64 may be discarded on the ocean bottom 11 by either removing the guide bar 74 therefrom or cutting the flexible line 75 above its connection to the guide bar. With the flexible line 75 so disconnected from the worn or used flowline 64, the line may be pulled to the operating station 13 and threaded through the guide sleeve 73 into secured engagement with a new flowline through a guide bar 74. The guide sleeve 73 may then be installed on the wellhead assembly and utilized to pull the new flowline into coupled engagement with the wellhead assembly in the manner described supra.

From the foregoing description, it is believed apparent that the present invention provides an effective means of remotely replacing and coupling underwater conduits while minimizing the amount and complexity of coupling apparatus, and the hazard to navigation. The description is, however, merely intended to be explanatory of the invention. Various changes in the details of the described method and illustrated construction may be made, within the scope of the appended claims, without departing from the spirit of the invention.

We claim as our invention:
1. A method of remotely connecting a pair of conduits submerged within a body of water the major portion of one of said conduits normally lying along the ocean floor, comprising:
 locating an operating station at the surface of the body of water;
 extending a flexible line from said operating station into slidable engagement with and past one of said conduits;
 fixedly securing a portion of said flexible line which extends past said one conduit to a substantially rigid portion of the other of said conduits at a point above the water surface; and,
 applying tension to said flexible line from said operating station to move the other of said conduits through the water and to pull said conduits into axial abutting engagement.

2. A method of remotely coupling the free ends of a pair of conduits submerged within a body of water the major portion of one of said conduits normally lying along the ocean floor, comprising:
 locating an operating station at the surface of the body of water;
 extending a flexible line from said operating station into slideable engagement with and past one of said conduits adajacent to the free end thereof;
 fixedly securing a portion of said flexible line which extends past said one conduit to a substantially rigid portion of the other of said conduits at a point above the water surface adjacent the free end thereof;
 applying tension to said flexible line from said operating station to move the other of said conduits through the water and to pull the free ends of the pair of conduits towards juxtaposed relationship;
 subsequently axially aligning the free end of said conduits upon approaching said juxtaposed relationship; and,
 securing said free ends in communication.

3. A method of remotely coupling a pair of conduits submerged within a body of water the major portion of one of said conduits normally lying along the ocean floor, comprising:
 locating an operating station at the surface of the body of water;
 extending a first flexible line from said operating station into fixedly secured engagement with a substantially rigid portion of one of said conduits;
 extending a second flexible line from said operating station into sliding engagement with and past the other of said conduits;
 slideably securing a portion of said second flexible line extending past said other conduit to said first flexible line;
 applying tension to said second flexible line from said operating station to pull the portion of said second flexible line slideably secured to said first flexible line to said one conduit; and
 applying continued tension to said second flexible line from the operating station to move the other of said conduits through the water and, to pull said conduits into engagement.

4. A method of remotely replacing a conduit releasably coupled to an installation submerged within a body of water, the major portion of said conduit normally lying along the ocean floor, comprising:
 locating an operating station at the surface of the body of water;
 extending a flexible line from said operating station into slideable engagement with and past the installation;
 fixedly securing a portion of the flexible line extending past the installation to a substantially rigid portion of said conduit;
 releasing the conduit from the installation;

pulling the conduit and the portion of the flexible line secured thereto to an accessible location;

removing said portion of the flexible line from said conduit;

fixedly securing said portion of the flexible line to a substantially rigid portion of a replacement conduit at a point above the water surface; and, applying tension to the flexible line from the operating station to move said conduit through the water and to pull the replacement conduit into coupled engagement with the installation.

5. A method of remotely replacing a conduit releasably secured to a coupling on an installation submerged within a body of water, the major portion of said conduit normally lying along the ocean floor, comprising:

locating an operating station at the surface of a body of water;

extending a flexible line from the operating station into slideable engagement and past the installation adjacent the coupling thereon;

fixedly securing a portion of the flexible line extending past the installation to a substantially rigid portion of said conduit adjacent the end thereof coupled to the installation;

releasing the conduit from the coupling on the installation;

pulling the conduit and said portion of the flexible line secured thereto to an accessible location;

removing said portion of the flexible line from said conduit;

fixedly securing said portion of the flexible line to a substantially rigid portion of a replacement conduit adjacent an end thereof at a point above the water surface, said end being adapted to be received in the coupling on the installation;

applying tension to said flexible line from the operating station to move said conduit through the water and to pull said end of the replacement conduit towards juxtaposed relationship with the coupling on the installation;

axially aligning said end of the replacement conduit with the coupling on the installation upon approaching said juxtaposed relationship; and, securing said end of the replacement conduit in communication with the coupling on the installation.

6. A method of remotely replacing a conduit releasably coupled to an installation submerged within a body of water, the major portion of said conduit normally lying along the ocean floor, comprising:

locating an operating station at the surface of the body of water;

extending a flexible line from said operating station into secured engagement with a substantially rigid portion of said conduit;

releasing the conduit from the installation;

pulling the flexible line and the conduit secured thereto to the operating station;

removing the flexible line from said conduit;

fixedly securing said flexible line to a substantially rigid portion of a replacement conduit at a point above the water surface;

extending an intermediate portion of said flexible line from said operating station into slideable engagement with the installation; and, applying tension to the flexible line from the operating station to move said conduit through the water and to pull the replacement conduit into coupled engagement with the installation.

7. A method of installing a conduit on a coupling of an installation submerged within a body of water, the major portion of said conduit normally lying along the ocean floor, comprising:

extending the intermediate portion of a flexible line from said operating station into slideable engagement with said installation adjacent the coupling thereon;

fixedly securing one end of said flexible line to a substantially rigid portion of a conduit adjacent an end thereof at a point above the water surface, said end being adapted to be received in the coupling of the installation;

applying tension to the other end of said flexible line from the operating station to move said conduit through the water and to pull the end of the conduit secured to said one end of the flexible line towards juxtaposed relationship with respect to the coupling on the installation;

axially aligning the end of the conduit secured to the flexible line with the coupling on the installation upon approaching said juxtaposed relationship; and, securing the end of said conduit secured to said flexible line in engagement with said coupling.

References Cited by the Examiner

UNITED STATES PATENTS

| | | | |
|---|---|---|---|
| 409,008 | 8/1889 | Breymann | 29—237 |
| 2,399,312 | 4/1946 | Augustine | 29—237 |
| 2,920,383 | 1/1960 | Aydelott | 29—237 |
| 3,062,287 | 11/1962 | Hayes | 166—66.5 X |

ISADOR WEIL, *Primary Examiner.*

ALAN COHAN, *Examiner.*